(12) United States Patent
Langouev et al.

(10) Patent No.: US 9,547,563 B2
(45) Date of Patent: Jan. 17, 2017

(54) RECOVERY SYSTEM AND METHOD FOR PERFORMING SITE RECOVERY USING REPLICATED RECOVERY-SPECIFIC METADATA

(71) Applicant: VMware, Inc., Palo Alto, CA (US)

(72) Inventors: Ilia Langouev, Santa Cruz, CA (US); Ryan D. Gallagher, Sunnyvale, CA (US); Aleksey Pershin, Fremont, CA (US); Ruopeng Ye, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 179 days.

(21) Appl. No.: 14/319,362

(22) Filed: Jun. 30, 2014

(65) Prior Publication Data

US 2015/0378839 A1 Dec. 31, 2015

(51) Int. Cl.
*G06F 11/00* (2006.01)
*G06F 11/14* (2006.01)
*H04L 29/08* (2006.01)
*G06F 9/00* (2006.01)
*H04L 29/14* (2006.01)

(52) U.S. Cl.
CPC ............ *G06F 11/1464* (2013.01); *G06F 9/00* (2013.01); *G06F 11/1451* (2013.01); *H04L 67/1095* (2013.01); *H04L 69/40* (2013.01); *G06F 2201/82* (2013.01); *G06F 2201/84* (2013.01)

(58) Field of Classification Search
USPC ........................................................ 714/15
See application file for complete search history.

(56) References Cited

U.S. PATENT DOCUMENTS

| | | | |
|---|---|---|---|
| 6,937,351 B1 * | 8/2005 | Weaver | G01B 9/04 356/614 |
| 7,593,966 B2 * | 9/2009 | Therrien | G06F 11/1448 |
| 8,593,918 B1 * | 11/2013 | LeCrone | G06F 13/00 369/30.01 |
| 8,601,209 B1 * | 12/2013 | LeCrone | G06F 11/2094 711/111 |
| 9,262,435 B2 * | 2/2016 | Vibhor | H04L 29/0854 |
| 9,336,226 B2 * | 5/2016 | Vibhor | H04L 29/0854 |
| 2009/0089340 A1 * | 4/2009 | Ohr | G06F 11/1662 |
| 2011/0271067 A1 * | 11/2011 | Chou | G06F 11/1448 711/162 |
| 2014/0189432 A1 * | 7/2014 | Gokhale | G06F 17/30289 714/41 |
| 2014/0201142 A1 * | 7/2014 | Varadharajan | G06F 17/30165 707/622 |
| 2014/0201154 A1 * | 7/2014 | Varadharajan | G06F 11/1451 707/647 |
| 2014/0201161 A1 * | 7/2014 | Kumarasamy | G06F 11/1469 707/679 |
| 2014/0281518 A1 * | 9/2014 | Erofeev | G06F 21/6218 713/165 |

* cited by examiner

*Primary Examiner* — Amine Riad

(57) ABSTRACT

A recovery system and method for performing site recovery utilizes recovery-specific metadata and files of protected clients at a primary site to recreate the protected clients at a secondary site. The recovery-specific metadata is collected from at least one component at the primary site, and stored with the files of protected clients at the primary site. The recovery-specific metadata and the files of the protected clients are replicated to the secondary site so that the protected clients can be recreated at the secondary site using the replicated information.

20 Claims, 5 Drawing Sheets

RECOVERY SYSTEM AND METHOD FOR PERFORMING SITE RECOVERY USING REPLICATED RECOVERY-SPECIFIC METADATA

BACKGROUND

Resource-consuming clients, such as virtual machines (VMs) or other software entities capable of running various applications, can be used to deploy applications in one or more virtual datacenters, which are virtualized collections of computing, storage, and networking resources of a distributed computer system. The physical resources that support the clients in the virtual datacenters may be located at one or more physical sites. Since at least some of the clients may be running business-critical applications, disaster recovery management systems may be deployed at some of the sites so that these clients can be recreated at recovery sites when needed.

In order to properly recreate clients in a recovery site during recovery or failover, additional information regarding the clients may be needed. For some disaster recovery management processes, metadata that includes the additional information may be separately transmitted to the recovery site from client data that includes the state of the clients for recreation. However, maintaining synchronization between the metadata and the client state data is difficult and error prone. Thus, there can be a mismatch between the metadata and the client state data since the two data may not represent the same point in time.

SUMMARY

A recovery system and method for performing site recovery utilizes recovery-specific metadata and files of protected clients at a primary site to recreate the protected clients at a secondary site. The recovery-specific metadata is collected from at least one component at the primary site, and stored with the files of protected clients at the primary site. The recovery-specific metadata and the files of the protected clients are replicated to the secondary site so that the protected clients can be recreated at the secondary site using the replicated information.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
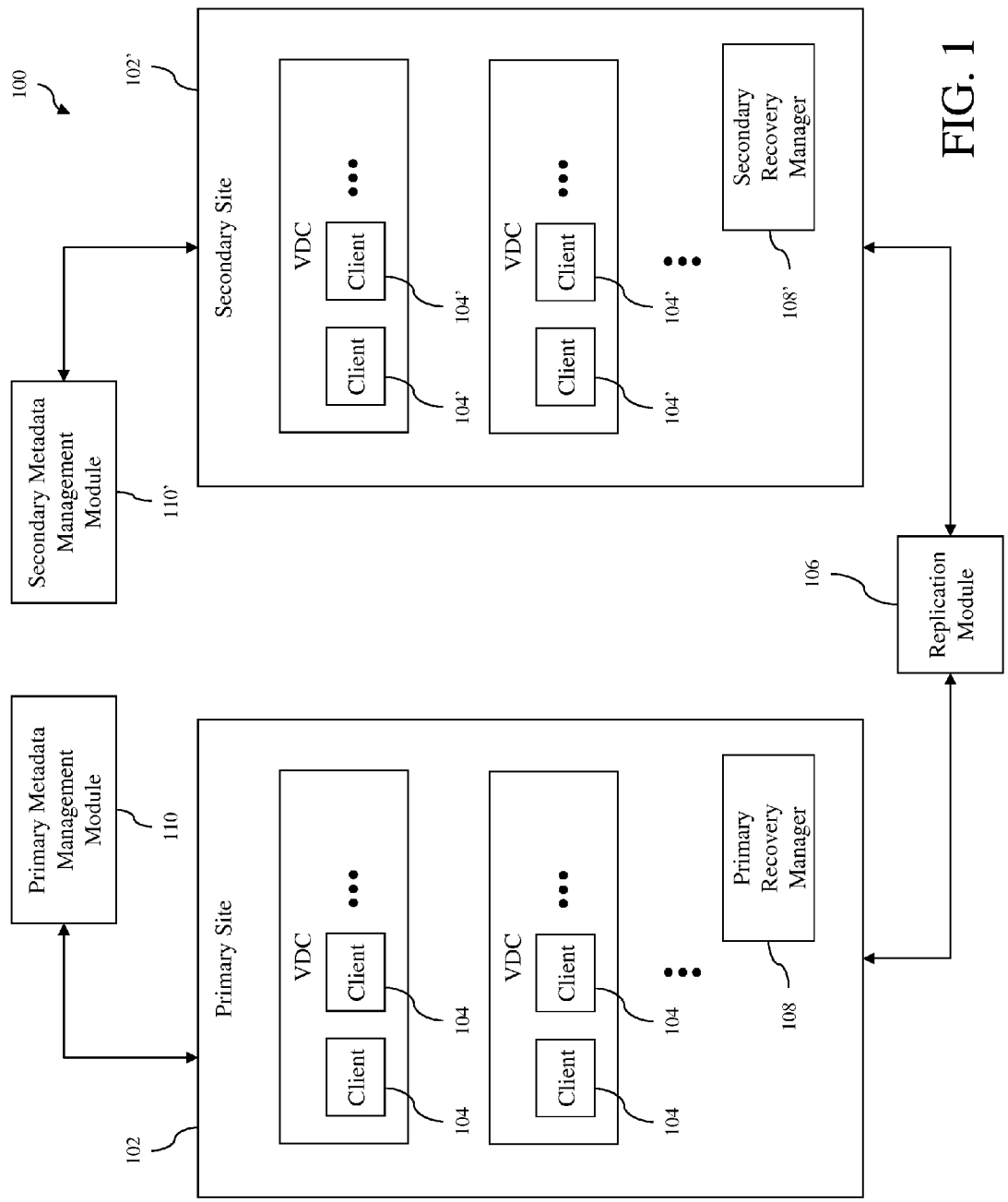
FIG. 1 is a block diagram of a recovery system in accordance with an embodiment of the invention.

Turning now to FIG. 1, a site recovery system 100 in accordance with an embodiment of the invention is shown. As shown in FIG. 1, the site recovery system includes a primary site 102, which is the protected site, and a secondary site 102', which is the recovery site. These sites may be located at different geographical locations so that failures or "disasters" at the primary site would not affect the secondary site. As described in more detail below, each of these sites includes sufficient hardware and software components to provide a computing environment for a number of clients 104 and 104' to execute various applications. As used herein, the term "client" is any software entity that can run on a computer system, such as a software application, a software process or a virtual machine (VM). In some implementations, these clients can be grouped as one or more virtual datacenters (VDCs) to support different services or functions. The clients 104 at the primary site are protected clients running in the primary site. The clients 104' at the secondary site are replicas of the protected clients (referred to herein as "replicated clients" or "recovered clients") that are deployed or recreated when a failure occurs at the primary site. The site recovery system provides disaster protection for at least some of the clients 104 running in the primary site so that, in the event of a disaster or failure at the primary site, these protected clients are automatically recovered at the secondary site in a consistent failover process.

As shown in FIG. 1, the site recovery system 100 further includes a replication module 106, a primary recovery manager 108, a secondary recovery manager 108', a primary metadata management module 110 and a secondary metadata management module 110'. The replication module operates to periodically replicate data at the primary site 102, which is related to the protected clients 104, to the second site 102' so that these clients can be recreated at the second site as the replicated clients 104' when needed, e.g., when a failure occurs at the primary site. The replicated data includes at least the files of the protected clients that are needed to recreate the protected clients in a new computing environment, as well as recovery-specific metadata. As used herein, recovery-specific metadata includes configuration and operation data that can be used for controlling the recovery process for each individual client or for controlling the recovered client after failover. The recovery-specific metadata are meaningful only for the recovery process and any additional components that interact with the recovered client during or after the recovery process. This recovery-specific metadata is not used by hypervisors that manage the clients, and thus, are external to the protected clients. The replication module may perform replication of the data from the primary site to the secondary site using any storage or database replication process. In some embodiments, the operations performed by the replication module may be provided to the primary and secondary sites as a service.

In some embodiments, the replication module 106 also creates storage snapshots or snapshots of the protected clients 104 at the secondary site 102' using the replicated data from the primary site 102. A storage snapshot is a state of a storage device or a storage array at a particular point in time, which can be used to restore stored data. A snapshot of a client is a file-based representation of the state of the client at a particular point in time. For a virtual machine, a snapshot includes the state of all the virtual machine's disks (or non-volatile computer memory), the contents of the virtual machine's memory (or volatile computer memory) and the virtual machine settings. The snapshot of a client includes at minimum all the files necessary to recreate or replicate the client, e.g., a virtual machine, in a computing environment. The storage or client snapshots are captured at different times to provide multiple points in time (MPIT) disaster recovery. The storage or client snapshots are used to recreate the protected clients 104 at the secondary site as the replicated clients 104' when needed, e.g., during a failover process. In some implementations, the snapshot creation process at the secondary site may be performed by another component, which may reside at the secondary site or may reside external to the secondary site.

In other embodiments, the replication module 106 may periodically create storage snapshots or snapshots of the protected clients 104 at the primary site 102 using the available data at the primary site. The snapshots may then be replicated to the secondary site 102' so that the snapshots are available at the secondary site to recreate the protected clients 104 at the secondary site as the replicated clients 104' when needed, e.g., during a failover process. In some implementations, the snapshot creation process at the primary site may be performed by another component, which may reside at the primary site or may reside external to the primary site.

The primary recovery manager 108 controls various operations at the primary site 102 to provide disaster protection. As an example, the primary recovery manager controls processes for preparing the primary site for disaster recovery, including processes for collecting the recovery-specific metadata from various sources at the primary site. The secondary recovery manager 108' controls various operations at the secondary site 102' to provide disaster protection. As an example, the secondary recovery manager controls extraction of the recovery-specific metadata from a storage snapshot or a group of client snapshots for a particular point in time, and deployment of the replicated clients 104' at the secondary site using the storage snapshot or client snapshots with the extracted recovery-specific metadata.

The primary metadata management module 110 operates to collect the recovery-specific metadata from various sources at the primary site 102 under the control of the primary recovery manager 108. The collected recovery-specific metadata can then be stored at the primary site with other data related to the protected clients 104, e.g., the files of the protected clients, and replicated to the secondary site 102'. The secondary metadata management module 110' operates to extract the replicated recovery-specific metadata at the secondary site when needed under the control of the secondary recovery manager 108'. The extracted recovery-specific metadata can then be distributed to one or more components at the secondary site to facilitate recreating of the protected clients 104 at the secondary site as the replicated clients 104'.

The operations of the replication module 106, the primary and secondary recovery managers 108 and 108' and the primary and secondary metadata management modules 110 and 110' will be described in more detail below. These components of the site recovery system 100 can be implemented as software, hardware or a combination of software and hardware. In some embodiments, at least some of these components are implemented as one or more software programs running in one or more computer systems using one or more processors associated with the computer systems.

Figure 2:
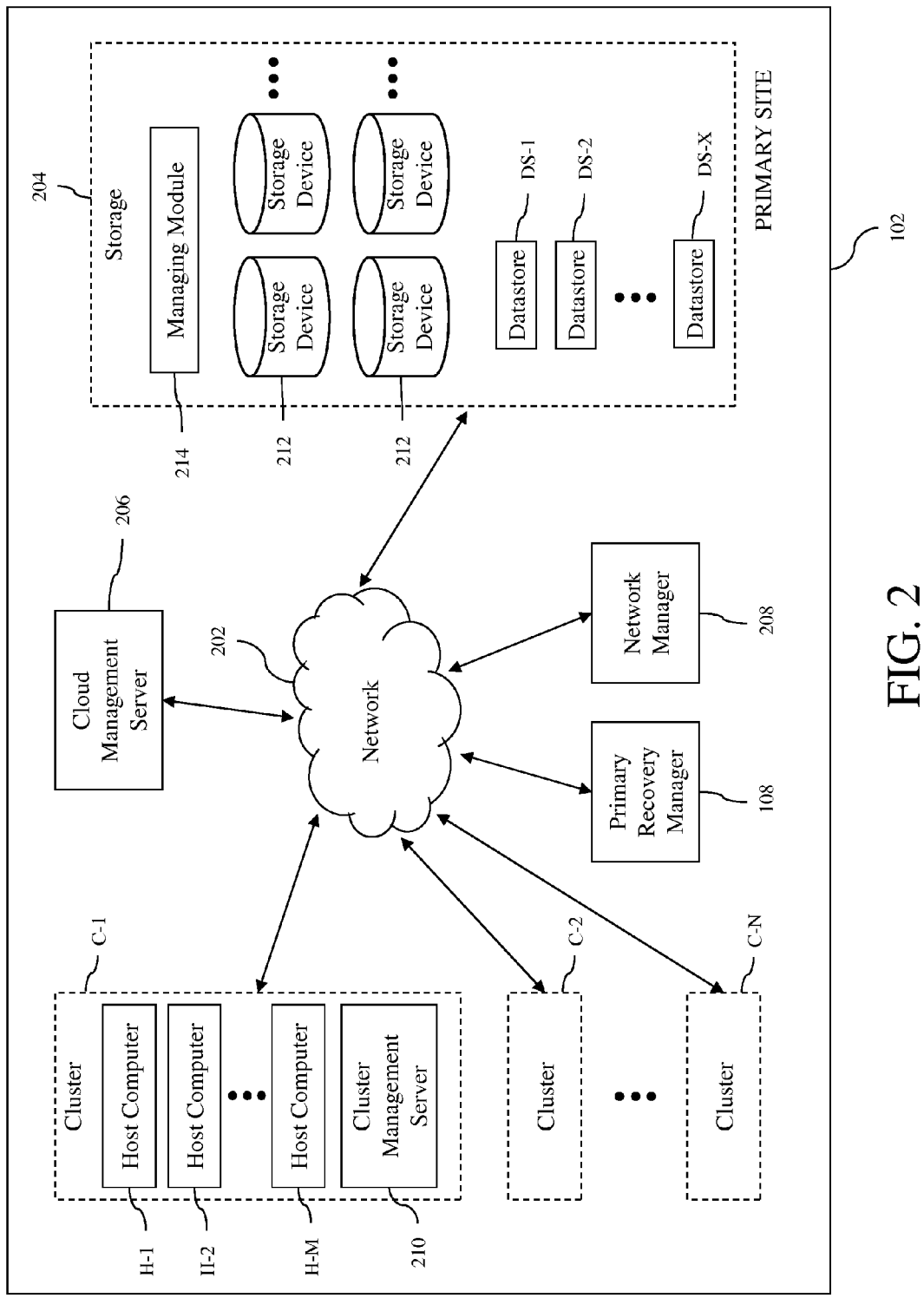
FIG. 2 is a block diagram of a primary site of the recovery system in accordance with an embodiment of the invention.

Turning now to FIG. 2, the primary site 102 in accordance with an embodiment of the invention is illustrated. As shown in FIG. 2, the primary site includes a network 202, clusters C-1, C-2 . . . C-N (where N is a positive integer) of host computers, storage 204, a cloud management server 206, a network manager 208 and the primary recovery manager 108. The clusters of host computers are used to support or host the clients 104 that can execute various applications. The exact number of host computer clusters situated at the primary site can be from a few clusters to tens of clusters or more. The clusters may be connected to other components at the primary site, as well as components outside of the primary site, via the network. Thus, the clients running in the clusters are able to communicate with any process or device connected to the network.

In the illustrated embodiment, each of the clusters C-1, C-2 . . . C-N includes a number of host computers H-1, H-2 . . . H-M (where M is a positive integer) and a cluster management server 210. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. The host computers may be servers that are commonly found in datacenters. As an example, the host computers may be servers installed in one or more server racks. In an embodiment, the host computers of a cluster are located within the same server rack. Since the clusters are connected to the network 202, each of the host computers in the clusters is able to access any process and device connected to the network. In particular, each of the host computers in the clusters is able to access the storage 204 via the network and may share the resources provided by the storage with the other host computers. Consequently, any client running on any of the host computers may also access the storage via the network.

Figure 3:
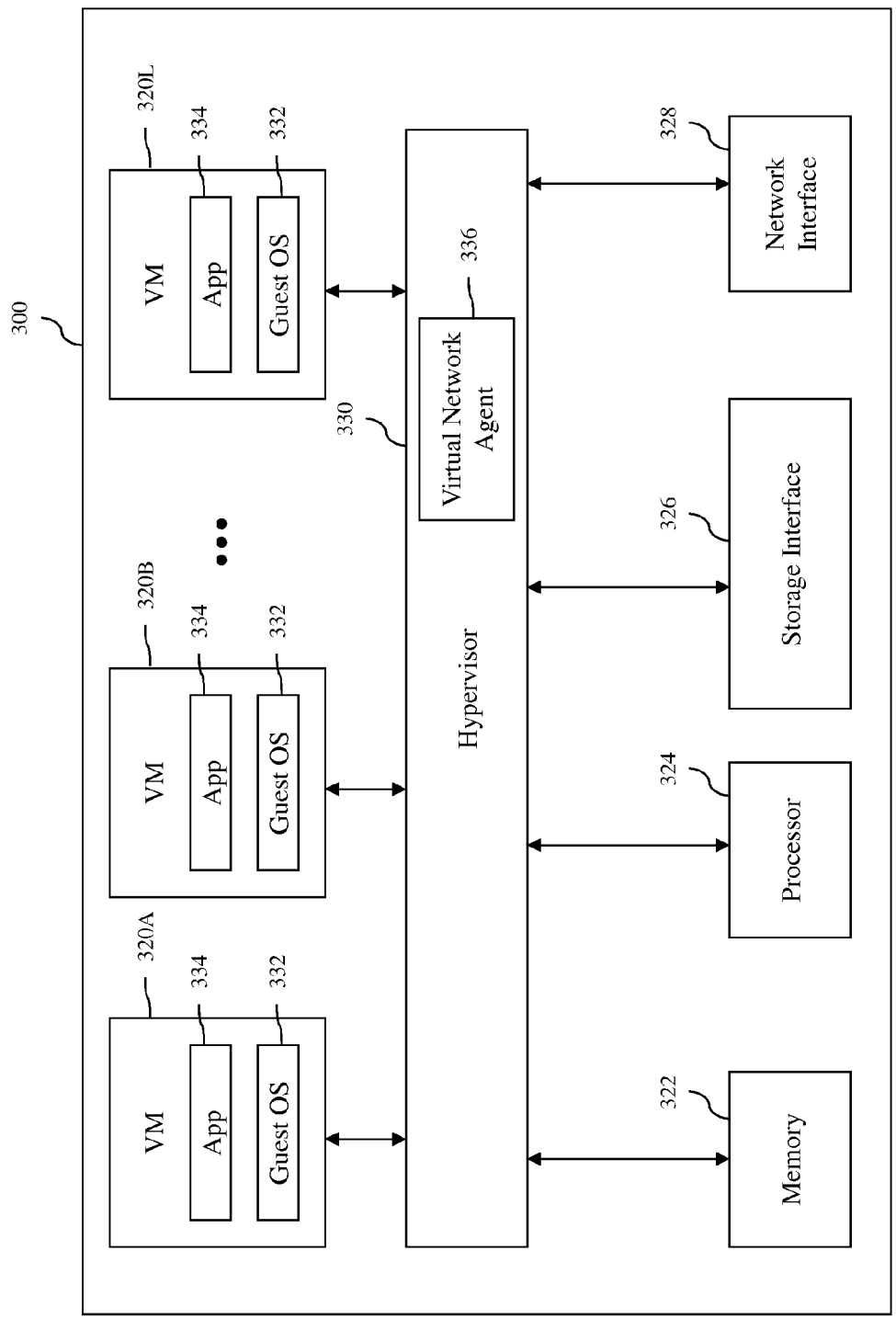
FIG. 3 is a block diagram of a host computer in accordance with an embodiment of the invention.

Turning now to FIG. 3, components of a host computer 300 that is representative of the host computers H-1, H-2 . . . H-M in accordance with an embodiment of the invention are shown. In FIG. 3, the physical connections between the various components of the host computer are not illustrated. In the illustrated embodiment, the host computer is configured to support a number of clients 320A, 320B . . . 320L (where L is a positive integer), which are VMs in this embodiment. However, in other embodiments, the clients can be any software entity. The number of VMs supported by the host computer can be anywhere from one to more than one hundred. The exact number of VMs supported by the host computer is only limited by the physical resources of the host computer. The VMs share at least some of the hardware resources of the host computer, which include system memory 322, one or more processors 324, a storage interface 326, and a network interface 328. The system memory 322, which may be random access memory (RAM), is the primary memory of the host computer. The processor 324 can be any type of a processor, such as a central processing unit (CPU) commonly found in a server. The storage interface 326 is an interface that allows that host computer to communicate with the storage 204. As an example, the storage interface may be a host bus adapter or a network file system interface. The network interface 328 is an interface that allows the host computer to communicate with other devices connected to the network 202. As an example, the network interface may be a network adapter.

In the illustrated embodiment, the VMs 320A, 320B . . . 320L run on top of a hypervisor 330, which is a software interface layer that enables sharing of the hardware resources of the host computer 300 by the VMs. However, in other embodiments, one or more of the VMs can be nested, i.e., a VM running in another VM. For example, one of the VMs may be running in a VM, which is also running in another VM. The hypervisor may run on top of the host computer's operating system or directly on hardware of the host computer. With the support of the hypervisor, the VMs provide virtualized computer systems that give the appearance of being distinct from the host computer and from each other. Each VM includes a guest operating system 332 and one or more guest applications 334. The guest operating system is a master control program of the respective VM and, among other things, the guest operating system forms a software platform on top of which the guest applications run.

Similar to any other computer system connected to the network 202, the VMs 320A, 320B . . . 320L are able to communicate with other computer systems connected to the network using the network interface 328 of the host computer 300. In addition, the VMs are able to access the storage 204 using the storage interface 326 of the host computer.

The host computer 300 further includes a virtual network agent 336. The virtual network agent operates with the hypervisor 330 to provide virtual networking capabilities, such as bridging, L3 routing, L2 switching and firewall capabilities, so that software defined networks or virtual networks can be created. In a particular embodiment, the virtual network agent may be part of a VMware NSX™ virtual network product installed in the recovery system 100 ("VMware NSX" is a trademark of VMware, Inc.).

Turning back to FIG. 2, each of the cluster management servers 210 in the clusters C-1, C-2 . . . C-N operates to monitor and manage the host computers H-1, H-2 . . . H-M in the respective cluster. Each cluster management server may be configured to monitor the current configurations of the host computers and the clients, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients are hosted or running on which host computers and in which cluster. The monitored configurations may also include client information. The client information may include size of each of the clients, virtualized hardware configuration of each of the clients, such as virtual CPU type, virtual network device and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server. The client information may also include information regarding resource pools, which are shared by a number of clients. The client information may further include hierarchical file folder information and tagging information for the clients. Each cluster management server may store the information regarding the clients in their cluster in any storage accessible by that cluster management server, such as the storage 204. Some or all of the information maintained by each cluster management server may be included in recovery-specific metadata.

In some embodiments, the cluster management servers 210 may be physical computers with each computer including at least memory and one or more processors, similar to the host computer 300. In other embodiments, the cluster management servers may be implemented as software programs running on physical computers, such as the host computer 300, or virtual computers, such as the VMs 320A, 320B . . . 320L. In an implementation, the cluster management servers are VMware® vCenter servers with at least some of the features available for such servers ("VMware" and "vCenter" are trademarks of VMware, Inc.).

The network 202 can be any type of computer network or a combination of networks that allows communications between devices connected to the network. The network 202 may include the Internet, a wide area network (WAN), a local area network (LAN), a storage area network (SAN), a fibre channel network and/or other networks. The network 202 may be configured to support protocols suited for communications with storage arrays, such as Fibre Channel, Internet Small Computer System Interface (iSCSI), Fibre Channel over Ethernet (FCoE) and HyperSCSI.

The storage 204 is used to store data for the host computers of the clusters C-1, C-2 . . . C-N, which can be accessed like any other storage device connected to computer systems. The storage also supports taking "storage snapshot". Each storage snapshot provides a consistent view of the data content on the storage at a given point in time. In an embodiment, the storage can be accessed by entities, such as clients running on the host computers, using any file system, e.g., virtual machine file system (VMFS) or network file system (NFS). The storage includes one or more computer data storage devices 212, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 214, which manages the operation of the storage. In an embodiment, the storage managing module is a computer program executing on one or more physical computers at the primary site 102. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. The same datastore may be associated with more than one cluster. For VMs, the datastores may be used to store virtual storage, e.g., virtual disks, used by each of the VMs, as well as other files needed to support the VMs, such as configuration files for the VMs. In a particular implementation, the files for a VM may include the following files:

(1) log file (a file that keeps a log of key VM activities, which can be useful in trouble shooting);
(2) nvram file (a file that stores the state of VM's BIOS);
(3) vmdk file (a virtual disk file, which stores the contents of the VM's hard disk drive;
(4) vmem file (a VM's paging file, which backs up the guest main memory on the host file system);
(5) vmsd file (a centralized file for storing information and metadata about snapshots);
(6) vmsn file (a snapshot state file, which stores the running state of a VM at the time when the snapshot was taken);
(7) vmss file (a suspended state file, which stores the state of a suspended VM);
(8) vmtm file (a configuration file containing team data—a team is a group of networked VMs that act together);
(9) vmx file (the primary configuration file of the VM, which stores settings for the VM); and
(10) vmxf file (a supplemental configuration file for VMs that are in a team).

In addition, the datastores may be used to store snapshots of clients, e.g., VMs, which may include some or all of the files of the clients, and/or recovery-specific metadata. The storage supports any storage or database replication process controlled by the replication module 106 so that client snapshots and recovery-specific metadata stored in the storage are automatically replicated in storage at the secondary site 102'. The storage or database replication process can be chosen based on the recovery point objective (RPO) and recovery time objective (RTO) of the recovery system 100. As an example, the storage or database replication process may be SQLite replication process.

The cloud management server 206 operates to monitor and manage the clusters C-1, C-2 . . . C-N to provide a cloud computing environment using the host computers H-1, H-2 . . . H-M in the clusters. The cloud management server allows administrators to create and use virtual datacenters (VDCs) with specified resource requirements. A single VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. In other embodiments, the cloud management server may be implemented as a software program running on a physical computer or a VM, which may be part of one of the clusters C-1, C-2 . . . C-N. In an implementation, the cloud management server is a server running VMware® vCloud Director® product ("vCloud Director" is a registered trademark of VMware, Inc.). The cluster management server may maintain or store information regarding the clients 104 at the primate site 102, such as to which VDCs the clients belong, in any storage accessible by the cloud management server, such as the storage 204. Some or all of the information maintained by the cloud management server may be included in recovery-specific metadata.

The network manager 208 operates to manage and control virtual networks at the primary site 102. Virtual networks, also referred to as logical overlay networks, comprise logical network devices and connections that are then mapped to physical networking resources in a manner analogous to the manner in which other physical resources as compute and storage are virtualized. The network manager has access to information regarding the physical network components at the primary site, such as host computers, switches and routers, as well as virtual network configurations, such as VMs, and the logical network connections between them. With the physical and virtual network information, the network manager may map the logical network configurations, e.g., logical switches, routers, and security devices to the physical network components that convey, route, and filter physical traffic in the primary site. Thus, the network manager maintains various network information, such as information regarding firewall rules and routing rules. The network manager may store the network information in any storage accessible by the network manager, such as the storage 204. In one particular implementation, the virtual network manager is a VMware NSX™ manager running on a physical computer at the primary site. Some or all of the information maintained by the network manager may be included in recovery-specific metadata.

The primary site 102 may further include other components found in computing environments. As an example, if the primary site is a VMware computing environment, the primary site may include management modules, such as VMware vCloud® Automation Center™ module and VMware® vCenter™ Operations Manager™ module ("Automation Center" and "Operations Manager" are trademarks of VMware, Inc.). These other components may store information relevant to the operation of the clients 104 running at the primary site, but are not included in the files of the clients. Some of the information maintained by these components may be included in recovery-specific metadata.

The primary recovery manager 108 at the primary site 102 controls various operations at the primary site to provide disaster protection. The primary recovery manager may control the processes for creating and managing recovery plans and automatically discovering and displaying the protected clients 104. The primary recovery manager may also control the mapping of the protected clients to appropriate resources on the secondary site 102'. The primary recovery manager also operates with the primary metadata management module 110 to collect recovery-specific metadata from various components at the primary site, which is stored in the storage 204 with the files of the protected clients 104 to be replicated to the secondary site.

The primary metadata management module 110 operates to communicate with various components at the primary site to collect recovery-specific metadata. As an example, the primary metadata management module communicates with the cluster management servers 210, which may be VMware® vCenter™ servers, and/or the cloud management server 206, which may be a VMware® vCloud Director® server, to retrieve recovery-specific metadata for the protected clients 104 at the primary site 102. The primary metadata management module may alternatively or additionally communicate with other components at the primary site, such as VMware vCloud® Automation Center™ module and/or VMware® vCenter™ Operations Manager™ module, to retrieve recovery-specific metadata for the protected clients. The primary metadata management module also operates to continuously monitor the recovery-specific metadata at the various components to keep track of changes to the recovery-specific metadata as it relates to the protected clients. In some embodiments, after the recovery-specific metadata for the protected clients has been collected, the primary metadata management module stores the recovery-specific metadata in the storage 204, which can then be replicated to the secondary site 102' by the replication module 106, and multiple snapshots can be created to support MPIT (Multiple Point-In-Time) recovery. In other embodiments, the snapshots are created at the primary site and the snapshots are replicated to the secondary site. In some implementations, the recovery-specific metadata for the protected clients may be stored in the same datastores where the files of the respective protected clients are stored. In some implementations, the recovery-specific metadata for the protected clients are embedded in one or more files of the protected clients, such as client configuration files of the protected clients. In a particular implementation in which the protected clients are VMs, the recovery-specific metadata for the protected clients are embedded in one or more VM files of the clients, such as VMX files. In these implementations, since the recovery-specific metadata is stored with or within the files of the protected clients, the recovery-specific metadata is replicated with the files of the clients so that the replicated recovery-specific metadata will be consistent or synchronized with the replicated files of the clients.

In some embodiments, the operations of the primary metadata management module 110 may be provided to the primary site 102 as a service. In these embodiments, the primary metadata management module may reside outside of the primary site, where the primary metadata management module communicates with necessary components at the primary site to collect and store the recovery-specific metadata in the storage 204 at the primary site to be replicated to the secondary site 102' by the replication module 106.

Figure 4:
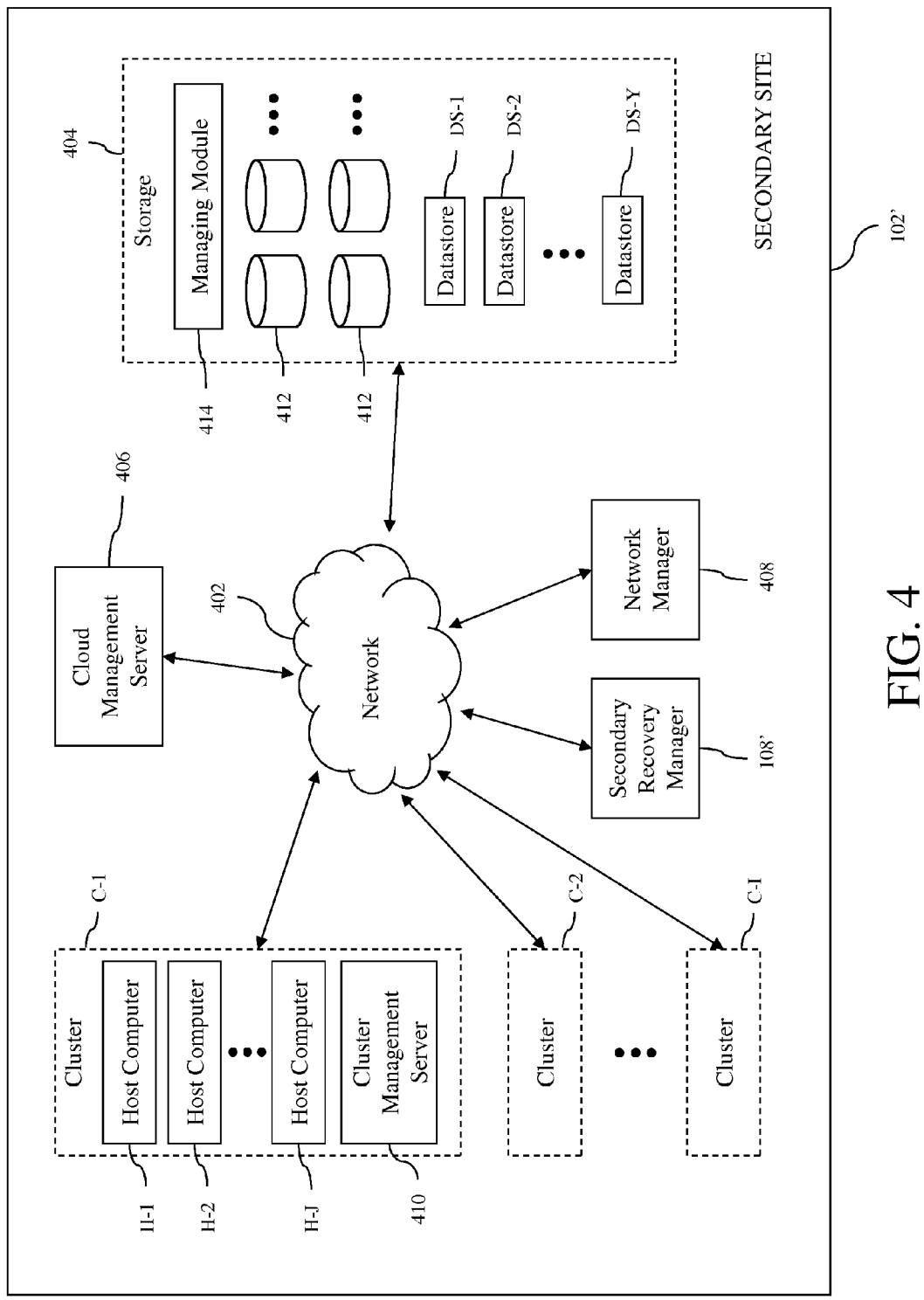
FIG. 4 is a block diagram of a secondary site of the recovery system in accordance with an embodiment of the invention.

Turning now to FIG. 4, the secondary site 102' in accordance with an embodiment of the invention is shown. As shown in the illustrated embodiment of FIG. 4, the secondary site may include all the components found in the primary site 102 so that the protected clients 104 at the primary site can be recreated or recovered at the secondary site. However, in other embodiments, the secondary site may have fewer or more components than the primary site. In the illustrated embodiment, the secondary site includes a network 402, clusters C-1, C-2 . . . C-I (where I is a positive integer) of host computers H-1, H-2 . . . H-J (where J is a positive integer), storage 404, a cloud management server 406, a network manager 408 and the secondary recovery manager 108'. The storage 404 includes one or more computer data storage devices 412 and a storage managing module 414, which support a number of datastores DS-1, DS-2 . . . DS-Y (where Y is a positive integer). The network 402, the clusters C-1, C-2 . . . C-I (including a cluster management server 410 for each cluster), the storage 404 (including the data storage devices 412 and the storage managing module 414), the cloud management server 406 and the network manager 408 at the secondary site may be similar or identical to the network 202, the clusters C-1, C-2 . . . C-N, the storage 204, the cloud management server 206 and the network manager 208 at the primary site. In some embodiments, the cluster management servers 410, the storage managing module 416, the cloud management server 406 and/or the network manager 408 may not be powered on or instantiated until needed, e.g., when a failure occurs at the primary site.

The secondary recovery manager 108' controls various operations at the secondary site 102' to provide disaster protection. In particular, the secondary recovery manager continuously communicates with the primary recovery manager 108 to detect when a failure occurs at the primary site 102. When a disaster recovery is needed, e.g., a failure is detected at the primary site, the secondary recovery manager selects a storage snapshot or a set of client snapshots for a particular point in time, which is/are stored in the storage 404, to recreate the protected clients 104 at the secondary site as the replicated clients 104'. In some embodiments, the storage or client snapshots are created by the replication module 106 in the storage 404 at the secondary site as part of a process of replicating data stored in the storage 204 at the primary site 102, e.g., the files of the protected clients 104 and the recovery-specific metadata. In other embodiments, the storage or client snapshots are created by the replication module 106 in the storage 204 at the primary site and then replicated to the storage 404 at the secondary site.

After the storage snapshot or client snapshots has/have been selected, the secondary metadata management module 110' retrieves and reads the recovery-specific metadata associated with the selected snapshot(s). If the recovery-specific metadata is embedded in one or more files of the clients, such as in primary configuration files of the clients, e.g., VMX files, the secondary metadata management module extracts the recovery-specific metadata from these files. The secondary metadata management module then processes the recovery-specific metadata to distribute the recovery-specific metadata to various components at the secondary site 102, such as the secondary recovery manager 108' and components that correspond to the sources at the primary site from which the recovery-specific metadata were collected. As an example, some of the recovery-specific metadata from the cluster management servers 210 at the primary site may be distributed to the cluster management servers 412 at the secondary site. As another example, some of the recovery-specific metadata from the cloud management server 206 at the primary site may be distributed to the cloud management server 406 at the secondary site.

The secondary recovery manager 108' then controls the deployment of the replicated or recreated clients 104' using the selected snapshot(s) and the replicated recovery-specific metadata. As an example, the replicated recovery-specific metadata may be used by the secondary recovery manager to set the network configurations for the recreated clients. In some embodiments, the secondary recovery manager deploys or creates the recovered clients based on a predefined sequence, which may have been defined by an administrator of the primary site 102. Since the proper recovery-specific metadata is available with the files of the protected clients 104 at the secondary site, this ensures that the recovery process for each individual client at the secondary site is properly executed.

Figure 5:
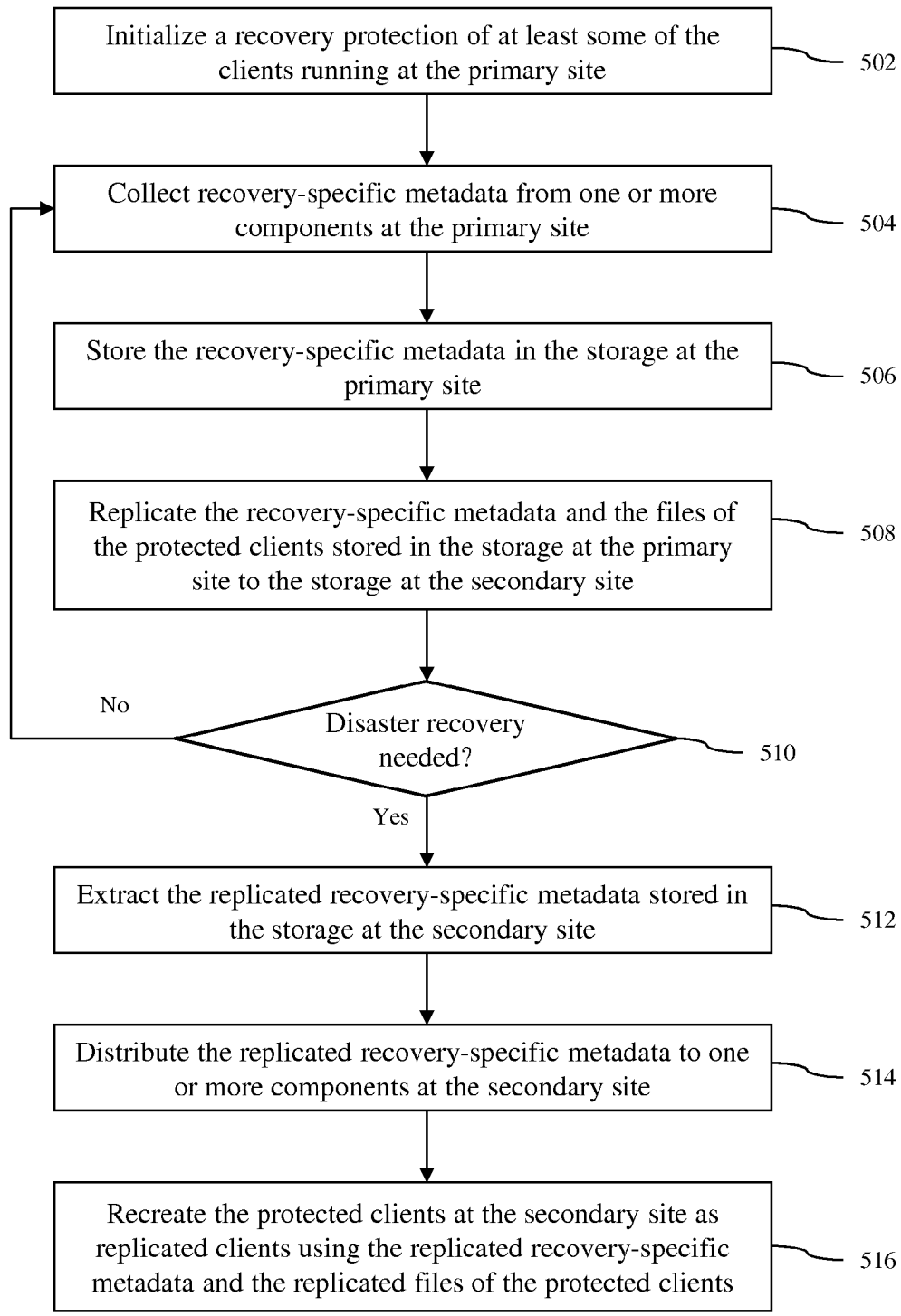
FIG. 5 is a flow diagram of a method for performing site recovery in accordance with an embodiment of the invention.

A method of performing site recovery in accordance with an embodiment of the invention is now described with reference to the process flow diagram of FIG. 5. At block 502, a recovery protection of at least some of the clients 104 running at the primary site 102 is initialized. This recovery protection initialization may involve enabling the primary and secondary recovery managers 108 and 108', as well as enabling the primary and secondary metadata management modules 110 and 110'. The recovery protection initialization may also involve setting up recovery plans, including the order in which the protected clients 104 are to be deployed at the secondary site 102' in the event of a failure at the primary site. At block 504, recovery-specific metadata is collected from one or more components at the primary site, such as the cluster management servers 210 the cloud management server 206 and/or the network manager 208, by the primary metadata management module 110. In some implementations, the collected recovery-specific metadata may reflect the same point in time when data stored in the storage 204 at the primary site, e.g., the files of the protected clients, is replicated to the storage 404 at the secondary site 102'. At block 506, the recovery-specific metadata is stored in the storage 204 at the primary site with the files of the protected clients by the primary metadata management module. In some implementations, the recovery-specific metadata may be embedded in some of the files of the protected clients. As an example, the recovery-specific metadata may be embedded in client configuration files of the protected clients, e.g., in VMX files. At block 508, the recovery-specific metadata and the files of the protected clients stored in the storage at the primary site are replicated to the storage 404 at the secondary site 102' by the replication module 106. Initially, the replication operation may involve replicating the entire files of the protected clients and the entire recovery-specific metadata. However, after the initial replication operation, only deltas or changes in the files of the protected clients and the recovery-specific metadata may be replicated. In some embodiments, storage or client snapshots are created or captured during the replication operations and stored in the storage at the secondary site.

Next, at block 510, a determination is made whether a disaster recovery is needed, e.g. when a failure is detected at the primary site 102. If no, then the method proceeds back to block 504 so that the latest recovery-specific metadata can be collected and stored in the storage 204 at the primary site. However, if a disaster recovery is needed, then the method proceeds to block 512, where the replicated recovery-specific metadata stored in the storage 404 at the secondary site 102' is extracted by the secondary metadata management module 110' with the corresponding replicated files of the protected clients 104 for a particular point in time. At block 514, the replicated recovery-specific metadata is then distributed to one or more components at the secondary site, including the secondary recovery manager 108'. Some of these components may correspond to the components at the primary site from where the recovery-specific metadata originated. Thus, the replicated recovery-specific metadata may be distributed to, for example, the cluster management servers 412, the cloud management server 406 and/or the network manager 408 at the secondary site. If some of these components are not enabled or running, then the components are enabled or instantiated before the replicated recovery-specific metadata is distributed. At block 516, the protected clients 104 are recreated at the secondary site as replicated clients 104' using the replicated recovery-specific metadata and the replicated files of the protected clients by the secondary recovery manager, which may involve using storage or client snapshots. These replicated clients may be created at the secondary site in a predefined order, which may have been defined by an administrator of the primary site. In some implementations, a user may be allowed to select a particular point in time and recreate the protected clients at that particular point in time. Thus, by recreating the protected clients at the secondary site using the files of the protected clients and the corresponding recovery-specific metadata that have been replicated together, the protected clients at the primary site can be recovered at the secondary site in a more reliable manner.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing site recovery, the method comprising:
    collecting recovery-specific metadata from at least one component at a primary site with a plurality of protected clients;
    storing the recovery-specific metadata in first storage at the primary site where files of the protected clients at the primary site are stored, including embedding the recovery-specific metadata in the files of the protected clients, wherein at least the recovery-specific metadata and the files of the protected clients are replicated in second storage at a secondary site;
    extracting replicated recovery-specific metadata from the second storage at the secondary site; and
    recreating the protected clients at the secondary site using replicated files of the protected clients and the replicated recovery-specific metadata in the second storage at the secondary site,
    wherein the storing the recovery-specific metadata includes embedding the recovery-specific metadata in the files of the protected clients.

2. The method of claim 1, further comprising periodically creating snapshots of at least the files of the protected clients and the recovery-specific metadata.

3. The method of claim 2, wherein the snapshots are created at the secondary site using the files of the protected clients and the recovery-specific metadata that have been replicated in the second storage at the secondary site.

4. The method of claim 1, wherein the storing the recovery-specific metadata in the first storage at the primary site includes storing the recovery-specific metadata in datastores that include the files of the protected clients.

5. The method of claim 1, wherein the embedding the recovery-specific metadata includes embedding the recovery-specific metadata in client configuration files of the protected clients.

6. The method of claim 5, wherein the protected clients are virtual machines and wherein the client configuration files are VMX files.

7. The method of claim 1, wherein the at least one component at the primary site includes at least one of a cluster management server, a cloud management server and a network manager.

8. The method of claim 1, further comprising distributing the replicated recovery-specific metadata to at least one component at the secondary site, the at least one component at the secondary site corresponding to the at least one component at the primary site.

9. A non-transitory computer-readable storage medium containing program instructions for method for performing site recovery, wherein execution of the program instructions by one or more processors of a computer system causes the one or more processors to perform steps comprising:
    collecting recovery-specific metadata from at least one component at a primary site with a plurality of protected clients;
    storing the recovery-specific metadata in first storage at the primary site where files of the protected clients at the primary site are stored, including embedding the recovery-specific metadata in the files of the protected clients, wherein at least the recovery-specific metadata and the files of the protected clients are replicated in second storage at a secondary site;
    extracting replicated recovery-specific metadata from the second storage at the secondary site; and
    recreating the protected clients at the secondary site using replicated files of the protected clients and the replicated recovery-specific metadata in the second storage at the secondary site.

10. The non-transitory computer-readable storage medium of claim 9, wherein the steps further comprise periodically creating snapshots of at least the files of the protected clients and the recovery-specific metadata.

11. The non-transitory computer-readable storage medium of claim 9, wherein the snapshots are created at the secondary site using the files of the protected clients and the recovery-specific metadata that have been replicated in the second storage at the secondary site.

12. The non-transitory computer-readable storage medium of claim 9, wherein the storing the recovery-specific metadata in the first storage at the primary site includes storing the recovery-specific metadata in datastores that include the files of the protected clients.

13. The non-transitory computer-readable storage medium of claim 9, wherein the embedding the recovery-specific metadata includes embedding the recovery-specific metadata in client configuration files of the protected clients.

14. The non-transitory computer-readable storage medium of claim 13, wherein the clients are virtual machines and wherein the client configuration files are VMX files.

15. The non-transitory computer-readable storage medium of claim 9, wherein the at least one component at the primary site includes at least one of a cluster management server, a cloud management server and a network manager.

16. The non-transitory computer-readable storage medium of claim 9, wherein the steps further comprise distributing the replicated recovery-specific metadata to at least one component at the secondary site, the at least one component at the secondary site corresponding to the at least one component at the primary site.

17. A recovery system comprising:
    a primary metadata management module associated with a primary site that includes a first plurality of host computers and first storage, the primary metadata management module being configured to collect recovery-specific metadata from at least one component at the primary site, wherein the recovery-specific metadata are stored in the first storage at the primary site with files of protected clients running on the first plurality of host computers, the primary metadata management module is further configured to embed the recovery-specific metadata in the files of the protected clients, the recovery-specific metadata and the files of the protected clients stored in the first stage at the primary site being replicated in second storage at a secondary site;
    a secondary metadata management module associated with the secondary site that includes a second plurality of host computers and the second storage, the secondary metadata management module being configured to extract replicated recovery-specific metadata from the second storage at the secondary site; and a recovery manager at the secondary site, the recovery manager being coupled to the secondary metadata management module to receive at least some of the replicated recovery-specific metadata, the recovery manager being configured to recreate the protected clients at the secondary site using replicated files of the protected clients and the replicated recovery-specific metadata.

18. The recovery system of claim 17, wherein the primary metadata management module is configured to store the recovery-specific metadata is stored in datastores that include the files of the protected clients.

19. The recovery system of claim 17, wherein the primary metadata management module is configured to embed the recovery-specific metadata in client configuration files of the protected clients.

20. The recovery system of claim 19, wherein the clients are virtual machines and wherein the client configuration files are VMX files.

* * * * *